F. M. RAY.
Car Spring.

No. 5,696.

2 Sheets—Sheet 1.

Patented Aug. 1, 1848.

F. M. RAY.
Car Spring.
No. 5,696.
2 Sheets—Sheet 2.
Patented Aug. 1, 1848.
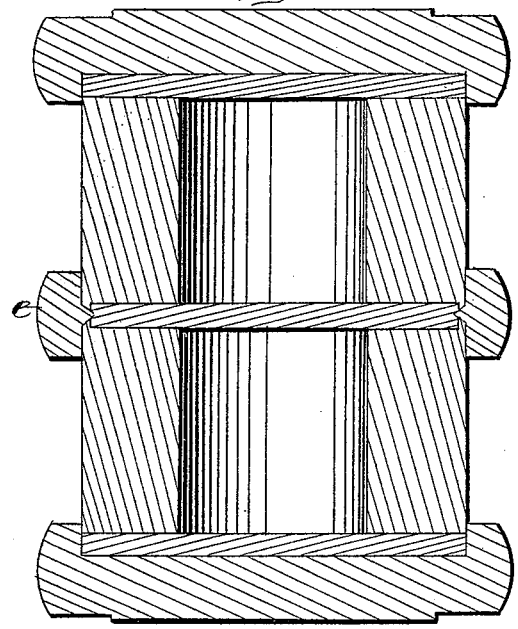
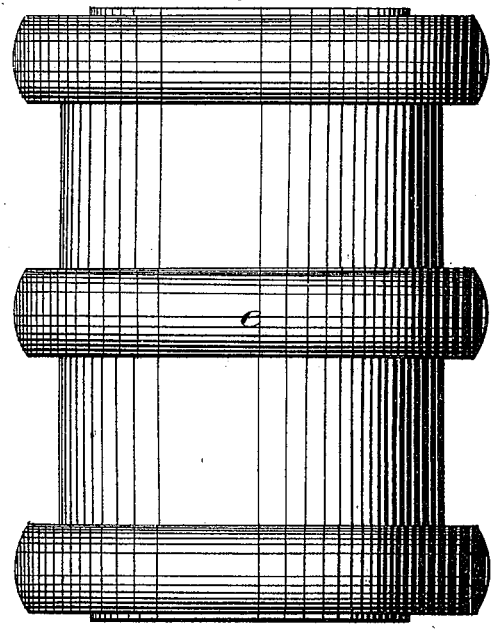
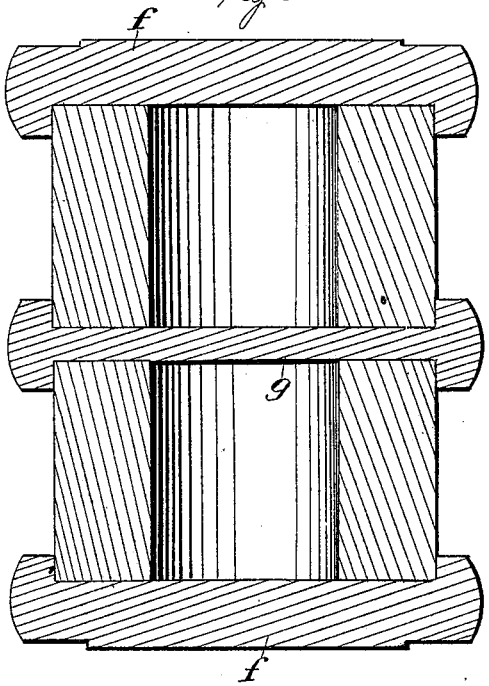

UNITED STATES PATENT OFFICE.

FOWLER M. RAY, OF NEW YORK, N. Y.

INDIA-RUBBER AND PNEUMATIC SPRING.

Specification of Letters Patent No. 5,696, dated August 1, 1848.

*To all whom it may concern:*

Be it known that I, FOWLER M. RAY, of the city, county, and State of New York, have invented new and useful Improvements in India - Rubber and Pneumatic Springs for Railroad Cars, Bumpers, &c., and that the following is a full, clear, and exact description of the principle or character which distinguishes them from all other things before known and of the manner of making, constructing, and using the same, reference being had to the accompanying drawings, making part of this specification, in which—

Figure 1:
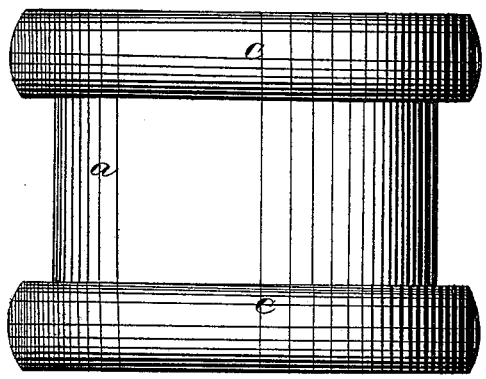
Figure 2:
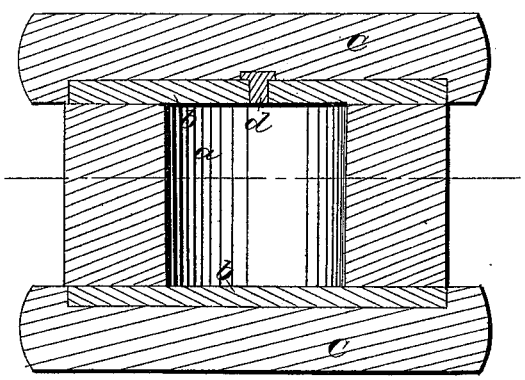

Figure 1 is an elevation; Fig. 2, a vertical, and Fig. 3, a horizontal section of my improved spring; Fig. 4, is an elevation, and Fig. 5, a vertical section of one modification of my improved spring, and Fig. 6, a vertical section of another modification thereof.

The same letters indicate like parts in all the figures.

I make my improved springs, bumpers, &c. of hollow cylinders of india rubber prepared after the manner of what is known as Goodyear's metallic rubber, sometimes called vulcanized rubber, or any other preparation having properties essentially the same, by means of which I am enabled to obtain a greater diameter to avoid bending under the action of the force applied than by any other known mode.

The first part of my invention consists in combining with such springs metallic hoops or rings put on the outer periphery to prevent the india rubber from spreading out under the action of the compressing force, and the better to prevent them from bending. The second part of my invention consists in combining the elasticity of atmospheric air with the elasticity of the india rubber cylinder, (or cylinders) by closing up the ends air tight either with india rubber or solid metal disks, that when the india rubber is compressed endwise the space within the cylinder shall be reduced, and compress the air contained therein.

Figure 3:
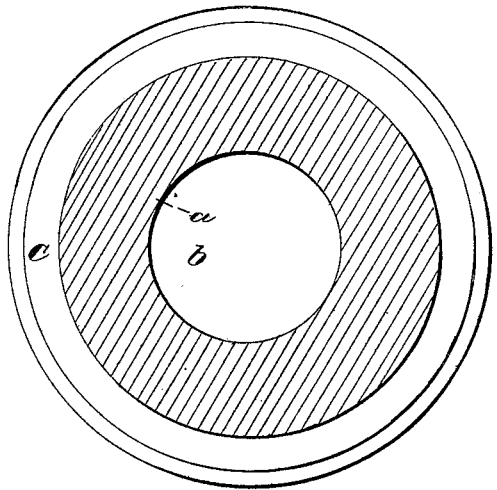

In the accompanying drawings, Figs. 1, 2, and 3, (*a*) represents a hollow cylinder made of india rubber prepared for being cured by heat in the manner of making Goodyear's vulcanized metallic rubber—such cylinder should be made of a thickness equal or nearly equal to one third its diameter, but which may be increased or diminished at pleasure to suit any purpose desired. The space within said cylinder is closed up air tight by cementing onto each end thereof a disk (*b*) of the same material. When thus prepared they are cured by the application of heat according to Goodyear's patent method. And when completely cured the space within will be perfectly air tight. The ends of such cylinders when completed are let into metal caps (*c, c*) which should be so formed as to admit of applying such springs between the body and truck of a railroad car, or otherwise modified to suit the purpose to which they are to be applied. The inner periphery of the caps by thus inclosing the ends of the cylinder prevent the india rubber from spreading out, and at the same time prevents the wear of the rubber by friction against the surface pressing onto it, which is known to be very great when it expands and contracts under the action of varying forces. If desired a hole with a plug (*d*) can be made in one end of the cylinder through which atmospheric air or other permanently elastic gas can be forced when it is desired to increase the elastic force of such springs beyond that due to the rubber and the atmospheric air let in under the pressure of the atmosphere. When it is desired to make a spring of greater length, instead of making the cylinder all in one piece, two or more cylinders may be connected together end to end, with a disk of india rubber interposed, as shown in Figs. 4 and 5, and a metallic band (*e*) slipped over the junction of the two cylinders, or if there be more than two, then one such band is to be put over each junction. For the purpose of sustaining such bands, or rather to prevent them from slipping, they may be made with a slight fillet or flanch inside which fits in a groove made in the cylinder. But when a long spring is made with a single cylinder it is to be sustained by external bands in the same way at given distances apart.

My improved springs may however be made without the india rubber disks at the ends, of each cylinder by simply inserting the ends in metal cases (*f*) as shown in Fig. 6, so that when pressed outward by the elastic force of the contained air the outer periphery shall come in contact with the metal surface and thus prevent the contained air from escaping by the packing properties of the india rubber. And when such springs are to be made of two or more cylinders then a metal plate with flanches is to be interposed between the ends of two cylinders as shown at (*g*), Fig. 6.

I have thus pointed out the principle of my invention, the mode of constructing and using the same, and the various modes in which I have contemplated the application of my invention, but I wish it to be distinctly understood that I do not wish to confine myself to the modes herein described, as the principle of my invention is susceptible of more modifications, and I have simply pointed out such as I have contemplated. Some of my improvements may be employed without the others and produce a good effect, as for instance, the outside hoops to prevent the india rubber from spreading out and the springs from bending may be employed with solid cylinders, instead of hollow cylinders, and produce a good effect although a better result will be produced by combining with such springs the elastic force of atmospheric air by making the cylinders hollow and closing up the ends with solid disks either of india rubber or metal.

I do not under this application claim the use of disks of india rubber with interposed metallic disks, as this is the subject of claim under another application now on file in the United States Patent Office; but What I do claim as my invention, and desire to secure by Letters Patent, is—

1. In combination with springs made of vulcanized rubber, substantially as above described, the use of hoops or bands on the external circumference at the ends, or between the ends, or at the ends and at any required distances between the ends, substantially in the manner and for the purpose above described.

2. I claim combining the elasticity of india rubber cylinders, substantially such as herein described, with the elasticity of atmospheric air or other permanently elastic gas by closing up the ends of such india rubber cylinders either with disks of india rubber, or the equivalents thereof, such as solid disks of metal, substantially in the manner and for the purpose specified.

FOWLER M. RAY.

In presence of—
A. P. BROWNE,
CHAS. M. KELLER.